(12) United States Patent
Daniel (10) Patent No.: US 7,975,914 B2
(45) Date of Patent: Jul. 12, 2011

(54) APPARATUS, SYSTEM AND METHOD FOR STORING PASSPORT INFORMATION

(75) Inventor: Isaac S. Daniel, Miami, FL (US)

(73) Assignee: F3M3 Companies, Inc., Miramar, FL (US)

( * ) Notice: Subject to any disclaimer, the term of this patent is extended or adjusted under 35 U.S.C. 154(b) by 0 days.

(21) Appl. No.: 12/584,375

(22) Filed: Sep. 4, 2009

(65) Prior Publication Data

US 2011/0057029 A1 Mar. 10, 2011

(51) Int. Cl.
*G06K 5/00* (2006.01)
(52) U.S. Cl. ......... 235/380; 235/382; 235/385; 235/379
(58) Field of Classification Search .................. 235/380, 235/382, 385, 379; 705/5
See application file for complete search history.

(56) References Cited

U.S. PATENT DOCUMENTS

| | | | |
|---|---|---|---|
| 5,657,008 A * | 8/1997 | Bantli | 340/933 |
| 6,094,640 A * | 7/2000 | Goheen | 705/5 |
| 2001/0016825 A1 * | 8/2001 | Pugliese et al. | 705/5 |
| 2003/0085808 A1 * | 5/2003 | Goldberg | 340/531 |
| 2004/0035928 A1 * | 2/2004 | Anderson | 235/385 |
| 2008/0223925 A1 * | 9/2008 | Saito et al. | 235/380 |
| 2008/0281740 A1 * | 11/2008 | Wu | 705/35 |
| 2009/0176559 A1 * | 7/2009 | Buchholz et al. | 463/25 |
| 2009/0313129 A1 * | 12/2009 | Rothschild | 705/17 |
| 2010/0023400 A1 * | 1/2010 | DeWitt | 705/14.53 |
| 2010/0135524 A1 * | 6/2010 | Durst et al. | 382/100 |
| 2010/0141453 A1 * | 6/2010 | Finn | 340/572.7 |

* cited by examiner

*Primary Examiner* — Allyson Trail
(74) *Attorney, Agent, or Firm* — Carol N. Green, Esq.

(57) ABSTRACT

The present invention is directed to an apparatus, system and method for storing passport information on a reusable immigration customs visa card for use as valid identification and proof of authorized entry within a country's borders. The immigration customs visa card is configured for being accessed by a passport card application program executable on a computer, where the card is configured for receiving a selection of passport information from a passport holder's passport via a passport reader or computer, when issued by an authorized institution. Once the immigration customs visa card has been issued, the card may be used as valid proof of authorized entry into the issuing country's borders.

39 Claims, 5 Drawing Sheets

APPARATUS, SYSTEM AND METHOD FOR STORING PASSPORT INFORMATION

I. FIELD OF THE INVENTION

The present invention is directed to an apparatus, system and method for storing passport information on a reusable immigration customs visa card for use as valid identification and proof of authorized entry within a country's borders. The immigration customs visa card is configured for being accessed by a passport card application program executable on a computer, where the card is configured for receiving a selection of passport information from a passport holder's passport via a passport reader or computer, when issued by an authorized institution. Once the immigration customs visa card has been issued, the card may be used as valid proof of authorized entry into the issuing country's borders.

II. PRIOR ART

In the wake of 9/11, most foreign countries require foreigners entering their country to provide a valid passport that can be scanned and/or optically reviewed as part of the country's immigration and customs controls. Additionally, certain businesses in foreign countries mandate proof of a valid passport as identification from foreigners prior to entering into large business transactions causing foreigners to travel with their passports at all times during their stay. Except, identity theft is a valid concern and most individuals would understandably prefer to secure their passport at a hotel rather than carry their passports with them as they sightsee and/or conduct business. Thus, there is a need for valid proof of authorized entry into a country in a manner that is convenient to carry during a foreigner's daily travels as they sightsee or conduct business abroad.

Passports are also easily lost and/or stolen creating a major inconvenience to replace, as notification to the proper authorities and obtaining a replacement generally causes an unexpected and often costly delay. This inconvenience may transcend beyond additional costs for an overstay, as it may also delay the passport owner's entry and/or reentry into a destination country. As such, there is a need for a system and method that will allow foreigners to have a valid identification system and method that does not involve keeping their passports on their persons at all times while travelling.

The prior art teaches a passport identification card which includes the passport holder's identification information, i.e. the photograph, names, date of birth, etc., printed in plain view. If this prior art passport identification card is lost and/or stolen, counterfeiters can artfully replace the photograph with another of like and/or similar features to closely match the original passport holder's description of weight, height, age, etc. Thus, there is a need for a secure electronic data card that may be used as identification for the holder, while the information is hidden from plain view, maintaining the security and integrity of the passport holder's identification information.

This invention satisfies these long felt needs and solves the limitations of the prior art in a new and novel manner.

SUMMARY OF THE INVENTION

A primary objective of the invention is to provide a convenient reusable immigration customs visa card that may be used as valid identification for individuals.

Another objective of the invention is to provide an immigration customs visa card that may be customized for a country's security requirements.

Still yet another objective of the invention is to provide an immigration customs visa card that may be used as identification for a passport holder, yet the immigration customs visa card has minimal external indicia of identification, if at all, and as such maintains the security and integrity of the passport holder's identification information.

Yet another objective of the invention is to provide a system and method for allowing a passport holder to have their passport information stored on an electronic data card.

The present invention overcomes the limitations of the prior art by an apparatus, system and method comprising of: a reusable immigration customs visa card, which includes an electronic data card configured for storing passport information and wherein the immigration customs visa card is configured for being accessed by a passport card application program executable on a computer; the immigration customs visa card configured for receiving, through the passport card application program, a selection of the passport information from a passport reader or computer when issued by an authorized institution; and the immigration customs visa card configured for automatically providing at least one of the selection of the passport information stored thereon in response to a request for the at least one of the selection of the passport information when read by a passport reader. The immigration customs visa card is also configured for displaying at least one of the passport information stored thereon in response to a request for the passport information from a third-party passport reader. Passport information may comprise of any one or more of the following: photograph, issuing country, passport number, surname, given names, address, nationality, date of birth, place of birth, sex, race, height, color of eyes, date of issue, passport expiration date, occupation, place of issue, authority or endorsement.

The immigration customs visa card is a functional component of a system, where the system comprises of: a computer, a passport card application program executable on the computer; and a passport reader connected to the computer and configured for reading passport information from a passport, and also configured for reading and writing the passport information to the immigration customs visa card, wherein the computer is configured with Internet connectivity for receiving reports on use activity of the immigration customs visa card from at least one third-party passport reader. The card is configured for being activated by an authorized institution of an issuing country to authorize use by recipient of immigration customs visa card as proof of identification or valid authorized entry within the issuing country's borders; as well as for displaying at least one passport information stored thereon in response to a request for the passport information from a third-party passport reader. The term "third-party" as used herein, e.g. "third-party" passport reader, means any entity other than the authorized institution that issues the immigration customs visa card.

The immigration customs visa card includes an identifier, e.g. a card number, programmed to be stored in correlation to at least one passport holder's passport information. This identifier is used by the system to identify the passport holder for which use activity information will be stored. The identifier may be located on the card's exterior or may be stored within. In one embodiment, the immigration customs visa card may display external markings that may include but is not limited to any one or more of the following: issuing country's name, country's insignia, emblem, logo, drawings, characters, endorsement, card number, or instructions, or any other markings that are known and used in the arts. In another embodiment, the card's exterior is devoid of many markings, if at all, retaining the secrecy of the passport information.

In yet another embodiment of the invention, the immigration customs visa card may include an embedded hologram, adding a layer of complexity for forgers to duplicate. The card may also include a security feature comprising of a thin film of mesh conductive wires that are interlaced with each other and positioned in between the two exterior sides of the immigration customs visa card. The mesh conductive wires are interconnected with each other and an electronic circuit, where the electronic circuit includes a circuit board having a battery and a microprocessor positioned thereon and connected to communication means, e.g. a transceiver, wherein the microprocessor generates an electronic signal for an alarm providing the generated electronic alarm signal to the communication means for transmission of the electronic alarm signal to or from the authorized institution. The electronic circuit may include a vibration motor electrically connected to a circuit board capable of causing a vibration of the card, or may include Dual-tone multi-frequency ("DTMF") decoders also electrically connected to the circuit board and speaker capable of sounding an audio alarm; a single tone alert system sounding an alarm like a Sonalert; or the microprocessor electrically connected to the mesh conductive wires and a transceiver, where the microprocessor is programmed to transmit a silent electronic alarm signal via the transceiver to the authorized institution. Thus, if the card is tampered with, e.g. an attempt is made to dismantle the card, an alarm will be triggered by the electronic circuit causing a vibration of the card, sounding of an audible alarm and/or transmitting of a silent alarm to the authorized institution alerting the authorities of the tampering activity.

The immigration customs visa card is selected from the group of electronic devices consisting essentially of smart cards, memory cards, and microprocessor cards, with memory means embedded therein for storing passport information. Also included in the immigration customs visa card are location determining means for determining the location of the immigration customs visa card with means for encoding the location into an electronic signal, which is transmitted to an authorized institution where the transmitted electronic signal is decoded and the location of the immigration customs visa card or use activity may be monitored in real-time.

In this manner, upon arrival in a foreign country the passport holder's passport information may be transferred from the passport to the immigration customs visa card via the passport reader, where once issued the card may be used for identification, and proof of authorized entry. The recipient then has a means of effectuating business transactions in a flexible, secure, standardized manner without having to use their passport or having their passport information exposed in plain view as only authorized passport readers may review the passport information stored on the card. If found or stolen the immigration customs visa card has minimal use as the finder has no inkling from the card's exterior whose likeness has been uploaded as the finder's visual image may be vastly different, e.g. race, color of hair, age, etc., from the passport holder's image stored thereon, rendering the card useless to anyone other than the original recipient.

The information uploaded to the immigration customs visa card is encrypted with military grade encryption such that the information cannot be altered or tampered with rendering the immigration customs visa card useless to any other than the present holder. For the foreigner's duration in a foreign land it is therefore beneficial to use the immigration customs visa card instead of the passport as the consequences of losing the immigration customs visa card is less dire than losing a passport. If lost, the holder may contact the appropriate authorities who can remotely deactivate the immigration customs visa card, such the information cannot be retrieved by ordinary means. Upon leaving the country the passport holder may return the immigration customs visa card to the issuing country, where the temporary passport information is removed and the card is made available for reuse by another foreigner.

Additional objectives of the present invention will appear as the description proceeds.

The foregoing and other objects and advantages will appear from the description to follow. In the description, references are made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views. The following detailed description is, therefore, not to be taken in a limiting sense, and the scope of the present invention is best defined by the appended claims.

BRIEF DESCRIPTION OF THE DRAWINGS

Further objectives and advantages of the present invention may be derived by referring to the detailed description and claims when considered in connection with the Figures, wherein like reference numbers refer to similar items throughout the Figures.

DETAILED DESCRIPTION OF THE PREFERRED EMBODIMENT

The following discussion describes in detail an embodiment of the apparatus, i.e. the immigration customs visa card 100, system 102 and method 104 for storing passport information 106 (not shown) thereon (as well as their equivalents). However, this discussion should not be construed, as limiting the invention to those particular embodiments, as practitioners skilled in the art will appreciate that an apparatus or system 102 may vary as to configuration and as to details of the parts, and that a method 104 may vary as to the specific steps and sequence, without departing from the basic concepts as disclosed herein. Similarly, the elements described herein may be implemented separately, or in various combinations without departing from the teachings of the present invention. Turning now descriptively to the drawings, in which similar reference characters denote similar elements throughout the several views.

Figure 1A:
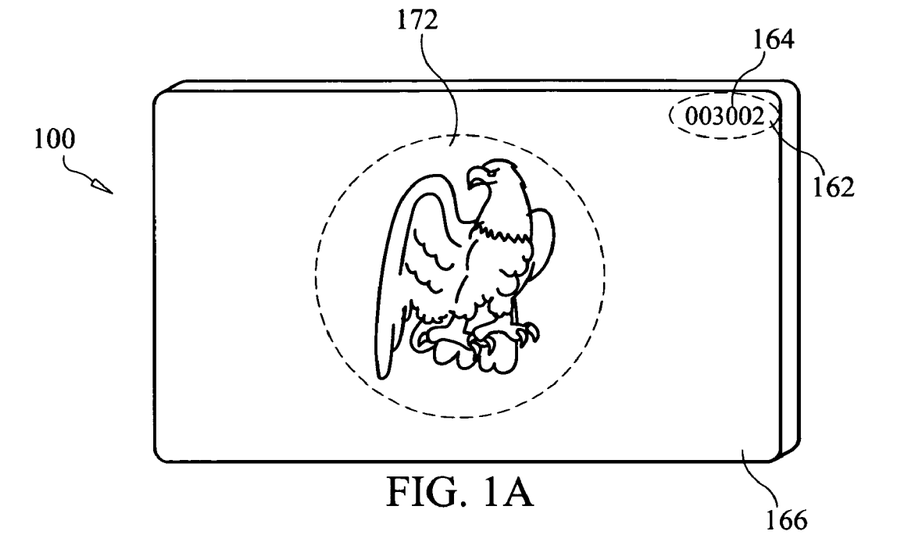
FIG. 1A is an exemplary embodiment of the immigration customs visa card according to an embodiment of the present invention.
Figure 1B:
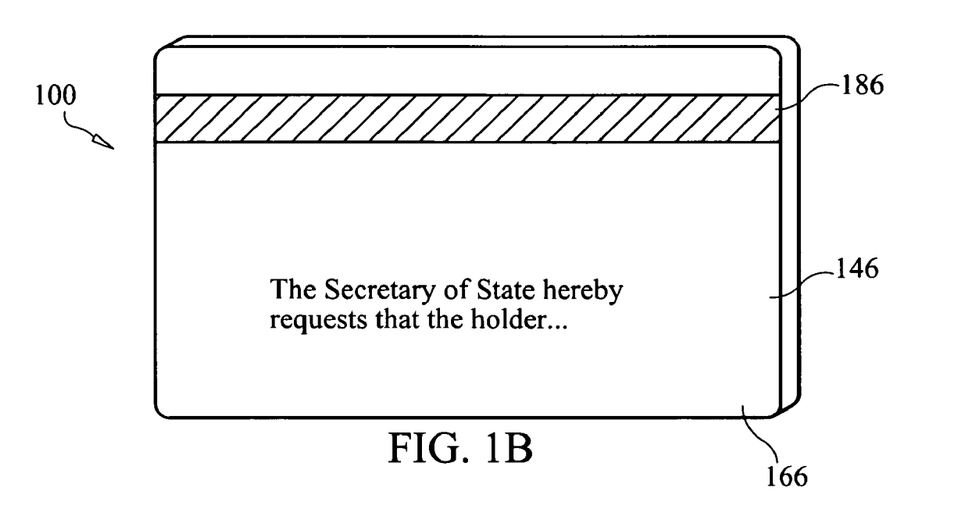
FIG. 1B is an exemplary embodiment of the reverse side of the immigration customs visa card according to an embodiment of the present invention.

FIG. 1A is an exemplary embodiment of the immigration customs visa card 100 (also referred to herein as the "card"), according to an embodiment of the present invention. FIG. 1B is an exemplary embodiment of the reverse side of the immigration customs visa card 100 according to an embodiment of the present invention. The reusable immigration customs visa card 100 includes an electronic data card 108 (not shown) configured for storing passport information 106 (not shown). Passport information 106 may comprise of any one or more of the following: a photograph 110 (not shown), issuing country 112 (not shown), passport number 114 (not shown), surname 116 (not shown), given names 118, 118' (not shown), address 120 (not shown), nationality 122 (not shown), date of birth 124 (not shown), place of birth 126 (not shown), sex 128 (not shown), race 130 (not shown), height 132 (not shown), color of eyes 134 (not shown), date of issue 136 (not shown), passport expiration date 138 (not shown), occupation 140 (not shown), place of issue 142 (not shown), authority 144 (not shown), or endorsement 146 as well as any other passport information 106 that is known and used in the arts. Endorsement 146 may comprise of a printed statement from the issuing country 112 requesting, for example, permission for the passport holder to gain legal access into the country where the passport 148 is being presented.

The invention is configured for being accessed by a passport card application program 150 executable on a computer 152, where the immigration customs visa card 100 is configured for receiving, through the passport card application program 150, a selection of the passport holder's passport information 106 (not shown) from a passport reader 154, or computer 152 (not shown) when issued by an authorized institution 156 (not shown). The immigration customs visa card 100 is configured for automatically providing at least one or a plurality of the received selection of passport information 106 stored thereon in response to a request for at least one or a plurality of the passport information 106 when read by a passport reader 154. For example, a merchant may swipe the immigration customs visa card 100 through a passport reader 154 where the photograph 110, surname 116 and/or given names 118 stored thereon may be requested for display. In this manner, the merchant can conduct a visual comparison of the holder of the immigration customs visa card 100 and the passport information 106 stored thereon.

The immigration customs visa card 100 is configured for being activated by an authorized institution 156 (not shown) of an issuing country 112, e.g. immigration and customs (hereinafter "customs") 158 (not shown). Thus, when a foreigner enters a foreign country, customs 158 may issue the reusable immigration customs visa card 100 to the recipient, who may use the card as proof of identification and/or valid authorized entry within the issuing country's borders 160 (not shown). Upon leaving, the immigration customs visa card 100 will be returned to customs 158, where the passport information 106 stored thereon is verified as belonging to the recipient, and/or that the foreigner did not extend their stay beyond the permitted time allotted by customs 158. Once customs 158 is in receipt of the returned immigration customs visa card 100, the passport information 106 stored thereon may be erased for reuse and reissuance of the card to another foreigner.

As shown in FIG. 1A, the immigration customs visa card 100 has an identifier 162, e.g. a card number 164, programmed to be stored to correlate with the passport holder's passport information 106, in particular, the passport number 114. The card number 164 may be displayed externally on the card's exterior 166 as seen in FIG. 1A, or optionally it may be excluded and stored thereon. The identifier 162 comprises of numbers, alphanumeric characters, and/or a combination thereof of varied lengths, or any other identifiers 162, 162' that are well known and used in the arts. In one embodiment of the invention, the immigration customs visa card 100 may include an embedded hologram 168, as an added security feature for the card.

The card's exterior 166 may optionally include other markings 170, 170' (not shown) that may be specific to the issuing country, e.g. the country's emblem 172 as depicted in FIG. 1A, and/or an endorsement 146 as shown on the reverse side of the card's exterior 166 as displayed in FIG. 1B. It is understood that any markings 170, 170' on the card's exterior 166 is optional. These markings 170, 170' may include but is not limited to any one or more of the following: issuing country's name 174 (not shown), country's insignia 176 (not shown), emblem 172 (not shown), logo 178 (not shown), drawings 180 (not shown), characters 182 (not shown), endorsement 146, card number 164, and so forth, without departing from the teachings of the systems, apparatus and methods herein. Optionally, the immigration customs visa card 100 may also include instructions 184 (not shown) for the card's return if found.

Also shown in FIG. 1B is a conventional magnetic strip 186, which may be used to make contact with the passport reader 154 for reading and writing passport information 106 stored thereon. In an alternate embodiment of the invention, the magnetic strip 186 is excluded as the card is programmed for access by the passport card application program 150, or computer 152 without the magnetic strip 186.

The immigration customs visa card 100 includes an electronic data card 108 (not shown) comprising essentially of smart cards, memory cards, and/or microprocessor cards configured with both memory, connectivity, and is adapted with security and processing features. The term "smart card" is used herein to describe an electronic device containing memory, with the ability to establish interconnectivity with a passport reader 154, embodied in the form of an electronic data card 108 (not shown) configured for facilitating the displaying of visual and written passport information 106 stored thereon. For example, and not of limitation, the immigration customs visa card 100 may contain information that may be used to display passport information 106, which may be used to identify the holder. The term "smart card," will be considered herein to include the "smart cards" in whatever form it may take, whether conventional or specific to one or more "smart card" types. It should be appreciated that the number, format and structure of the passport information 106 carried by the immigration customs visa card 100 may differ from those of current smart cards without departing from the teachings of the systems, apparatus and methods herein.

Figure 1C:
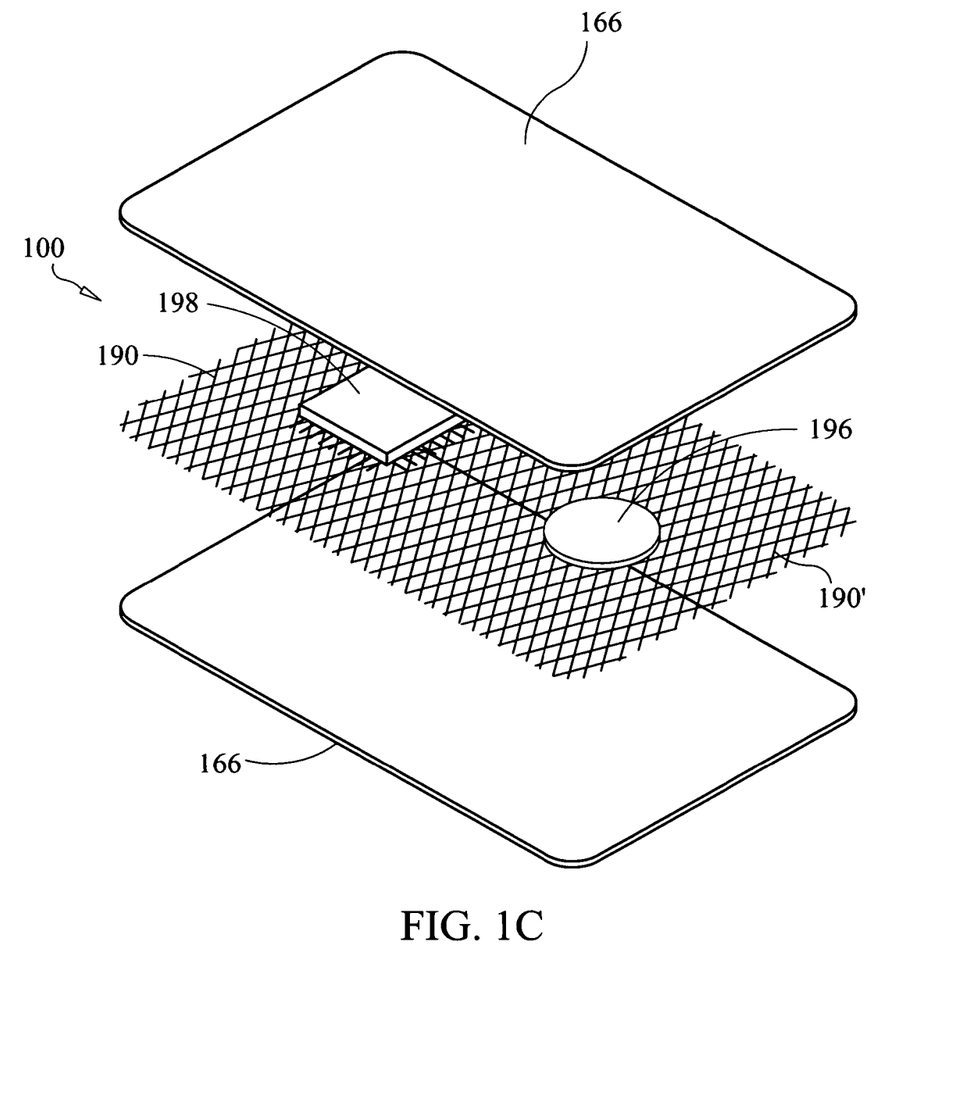
FIG. 1C is an exploded view of an embodiment of the immigration customs visa card according to an embodiment of the present invention.

FIG. 1C is an exploded view of an embodiment of the immigration customs visa card 100 according to an embodiment of the present invention. The card may include a security feature comprising of a thin film of mesh conductive wires 190, 190 that are interlaced with each other and positioned within the card. The mesh conductive wires 190, 190 are interconnected with each other and an electronic circuit 192 (not shown), where the electronic circuit 192 (not shown) includes a circuit board 194 (not shown) having a battery 196, which serves as a power source, and a microprocessor 198 positioned thereon that is connected to communication means 200 (not shown), e.g. a transceiver 202 (not shown), for transmission to/from the authorized institution 156. Also included in the card is memory means 204 (not shown), which include but is not limited to RAM, SRAM, DRAM storage media or any other form of recording and storage media that are well known and used in the arts suitable for practicing the invention.

Preferably, the circuit board 194 is formed from a polyimide film which is flexible yet remains stable in a wide range of extreme temperatures, e.g. Kapton®. However, the circuit board 194 may be formed from silicon, fiberglass, Mylar, or other suitable materials that are well known and used in the art. An antenna 206 (not shown) is electrically connected via the mesh conductive wires 190, 190 to the microprocessor 198 on the circuit board 194 or alternatively imbedded within the microprocessor 198. The communication means 200 (not shown) transmits and receives wireless communications through a wireless communications network from the authorized institution 156. The communication means 200 (not shown) may include but is not limited to Blue Tooth, Zigbee, 802.11 series, or any other short range wireless protocol that is well known and used in the art and other future short range wireless protocol suitable for transmitting and receiving data.

If the card is being tampered with, the microprocessor 198 is capable of generating an electronic signal 208 (not shown) for an alarm providing the generated electronic signal 208 to the communication means 200 (not shown) for transmission thereof to the authorized institution 156. The electronic circuit 192 may include a vibration motor electrically connected to the circuit board 194 capable of causing a vibration of the card, or may include Dual-tone multi-frequency ("DTMF") decoders also electrically connected to the circuit board 194 and a speaker 210 (not shown) capable of sounding, an audio alarm; a single tone alert system 102 sounding an alarm like a Sonalert; or the microprocessor 198 electrically connected to the mesh conductive wires 190, 190' and a transceiver 202, where the microprocessor 198 is programmed to transmit a silent electronic signal 208 for the alarm via the transceiver 202 to the authorized institution 156. Thus, if the card is tampered with, e.g. an attempt to dismantle the card, an alarm will be triggered by the electronic circuit 192 causing the card to vibrate, transmitting of a silent alarm to the authorized institution 156 and/or sounding an audible alarm alerting the authorities of the tampering activity. Upon receipt of the electronic signal 208 for the alarm, the authorized institution 156 may take appropriate steps to investigate and may issue an electronic signal 208 remotely to temporarily or permanently disable the card.

The immigration customs visa card 100 may include a Global Positioning System (GPS) location determining means 212 (not shown), e.g. a transponder 214 (not shown), with communication means 200 (not shown) for transmitting and receiving at least one electronic signal 208 to/from the authorized institution 156 notifying the authorized institution 156 of the card's geographical coordinates at any given time. The communication means 200 (not shown) may communicate with either a geosynchronous (GEO) or Low Earth Orbit (LEO) satellite in a network. The authorized institution 156 is therefore able to monitor signals received by a communication system 216 (not shown), which is preferably a satellite system 218 (not shown), from each immigration customs visa card 10.

Figure 2:
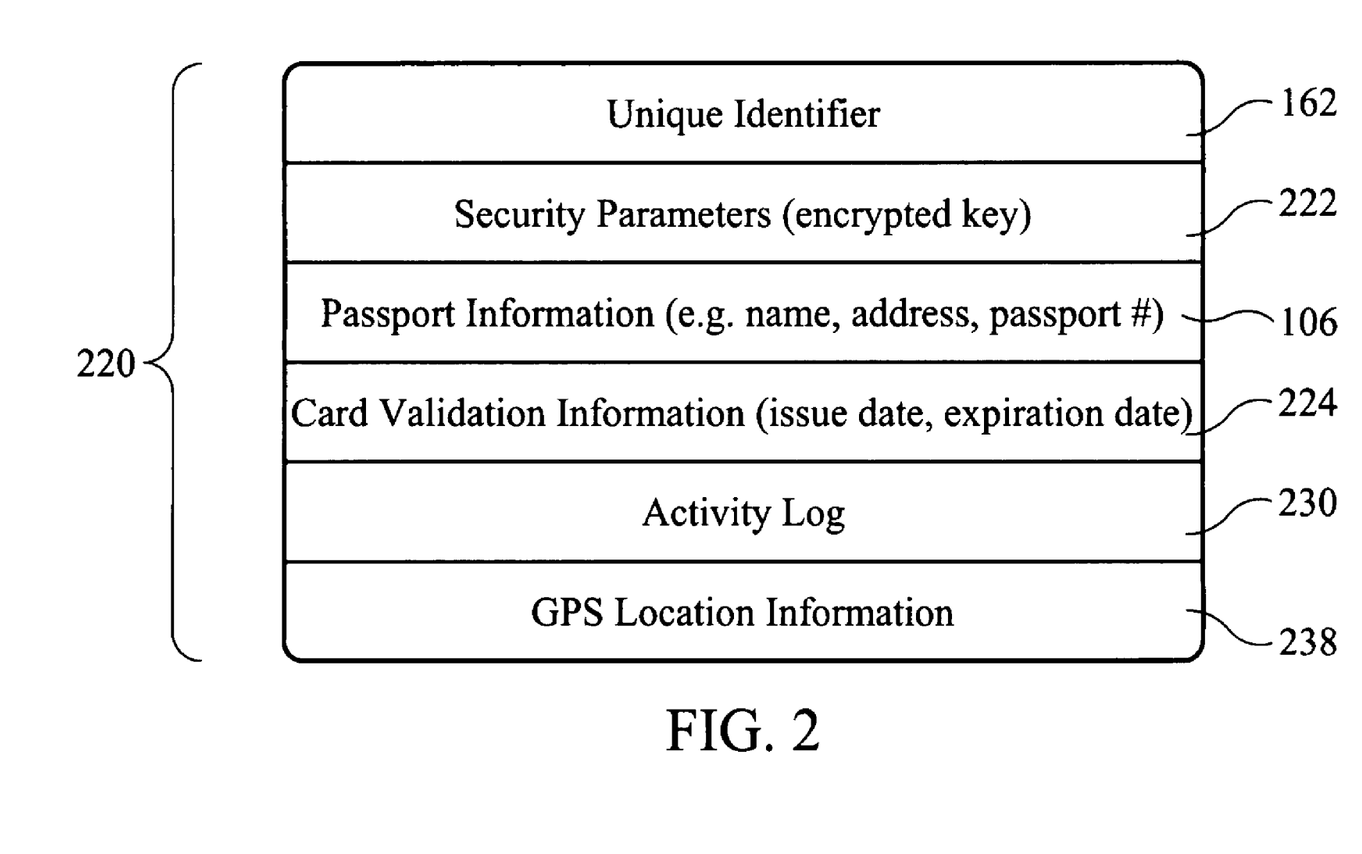
FIG. 2 illustrates, by way of example, data structures retained within a version of the immigration customs visa card.

FIG. 2 illustrates, by way of example, collectively the data structures 220 stored within an embodiment of the immigration customs visa card 100. The unique identifier 162 allows the system 102 to uniquely recognize each immigration customs visa card 100 individually for reporting by merchant's passport readers 154, 154', or other authorized institutions 156, 156' as the card is being used during the foreigner's stay in the country. In this manner, a forensic audit trail may be developed for the recipient of the immigration customs visa card 100 from customs 158, for each system 102 access by third-party passport readers 154, 154' as the card is being used.

Data structures 220 are retained within the electronic data card's memory means 204 (not shown), which preferably provides sufficient processing resources to facilitate communication and maintain adequate security for the card. Security parameters 222 may be provided, that may include an encrypted key(s) of military grade, and or security codes, biometric security features, and/or other security mechanisms. Passport information 106 for the card recipient may be retained, e.g. photograph 110, surname 116, given names 118, 118', date of birth 124, and so forth. It will be understood that access to the passport information 106 may be provided in a hierarchical form associated with security provisions to protect the passport information 106 stored thereon.

Card Validation Information 224, e.g. card issue date 226 (not shown), which corresponds to the date of entry into the issuing county 112, and/or card expiration date 228 (not shown), which corresponds to the expiration date of the stay allowed by customs 158 into the issuing country 112. The Activity Log 230 may optionally contain a record of all uses of the immigration customs visa card 100 during the foreigner's stay as reported by merchants, business or legal authority. In this manner, if forensic information is needed for the activities of a "foreigner of interest" the information can be obtained from the Activity Log 230. Certain countries may opt to refrain from storing and or maintaining the Activity Log 230 based on their policies or laws on privacy issues. Such countries may also choose not to engage the Global Positioning System ("GPS") location determining means 212 (not shown), e.g. a GPS transponder 214, for determining the location 232 (not shown) of the immigration customs visa card 100 with means for encoding 234 (not shown) the location 232 into an electronic signal 208 (not shown) using e.g. a microprocessor 198, which is transmitted to an authorized institution 156 where the transmitted electronic signal 208 is decoded and the location 232 of the immigration customs visa card 100 or use activity 236 (not shown) may be monitored in real-time. Therefore, the location 232 of the card and as such the recipient may be determined in real-time via global satellite system, and the information, i.e. the longitude and latitude coordinates, may be stored in the GPS Location Information 238.

Figure 3:
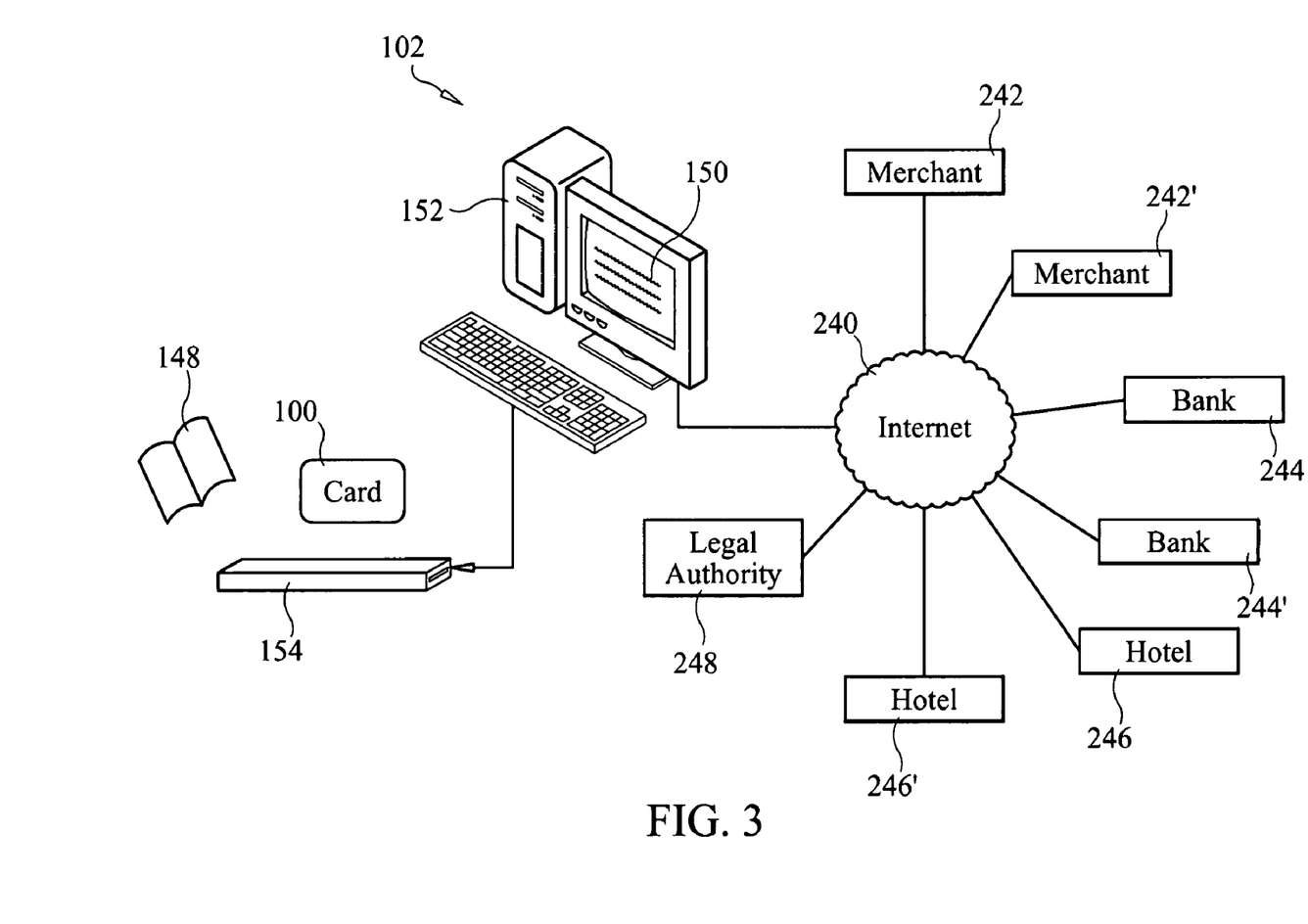
FIG. 3 is a sample flowchart of a block diagram of an exemplary system of the invention.

FIG. 3 is a sample flowchart of a block diagram of an exemplary system 102 of the invention. The immigration customs visa card 100 is a functional component of a system 102, where the system 102 comprises of: a reusable immigration customs visa card 100, which includes an electronic data card 108 configured for storing passport information 106; a computer 152 configured with Internet 240 connectivity for receiving reports on use activity 236 of the immigration customs visa card 100 from at least one third-party passport reader 154; a passport card application program 150 executable on the computer 152; and a passport reader 154 connected to the computer 152 and configured for reading passport information 106 from a passport 148, and also configured for reading and writing passport information 106 to the immigration customs visa card 100. The immigration customs visa card 100 is shown for use with the system 102 and is configured for being accessed by a passport card application program 150 executable on a computer 152. The card is configured for receiving, through the passport card application program 150, a selection of the passport information 106 from a passport reader 154 or computer 152 when issued by an authorized institution 156; and is also configured for automatically providing at least one or a plurality of the selection of the passport information 106 stored thereon in response to a request for at least one or a plurality of the selection of the passport information 106 when read by a passport reader 154.

The card contains means for establishing wired and/or wireless connectivity with external devices and internal memory means 204 (not shown) for retaining passport information 106, and for securing the passport information 106 stored thereon, via for example a microchip and/or a microprocessor 198 embedded within. The passport reader 154 describes a device for scanning and reading passport information 106 from a passport 148 accessing passport information 106 stored thereon, and for writing and/or reading passport information 106 on the electronic data card 108 (i.e., smart card or similar). Passport reader 154 as exemplified may be adapted with electrical contacts for establishing wired and/or wireless connectivity to immigration customs visa cards 100, 100', 100". The passport reader 154 may be integrated within a computer 152 (e.g. with a slot for wired card connectivity), an external device (e.g., USB connection to a small housing), or be integrated into other devices that are known and used in the arts. Alternatively, a wireless connection may be established, wherein communication access is established in response to proximity or manual activation of the passport reader 154.

A computer 152, e.g. a network enabled computer 152, a laptop or personal digital assistant subject to wired/wireless connectivity is configured with a passport card application program 150 to allow communications between the immigration customs visa card 100 through passport reader 154. The passport card application program 152 may comprise in part of a browser, such as for use on a personal computer 152 or similar browsing device. Alternatively, the passport card application program 152 may comprise one or more applications associated with third-party passport readers 154, 154', such as those used by merchants 242, 242', banks 244, 244', hotels 246, 246', legal authorities 248 and/or other authorized third-party passport readers 154, 154'.

Customs 158 and or other authorized agencies oversee the issuance of the immigration customs and visa cards 100, 100' to foreigners as they enter the issuing country 112. The passport holder's information is read from his/her passport 148 via the passport reader 154 and later transferred to the immigration customs visa card 100 by the card making wired or wireless contact with the passport reader 154. Once the card is issued, merchants 242, 242', banks 244, 244', hotels 246, 246', legal authorities 248 may verify the validity of the immigration customs visa card 100 using the Internet 240 or report on use activity 236, via a conventional Internet browser, such as Microsoft Explorer, Mozzila FireFox, Netscape Navigator, and/or other programs configured for providing similar connectivity over a network. According to the invention, there is no restriction on the number of third-parties accessing the authorized institution's electronic system 102 to verify the validity of the card and/or provide reporting information to the Activity Log 230. The authorized institution 156 maintains an electronic card database 250 (not shown) for storing and maintaining information for each issued immigration customs visa card 100 and for correspondingly determining the validity of the cards when verified by a passport reader 154 as the card is being used.

Figure 4:
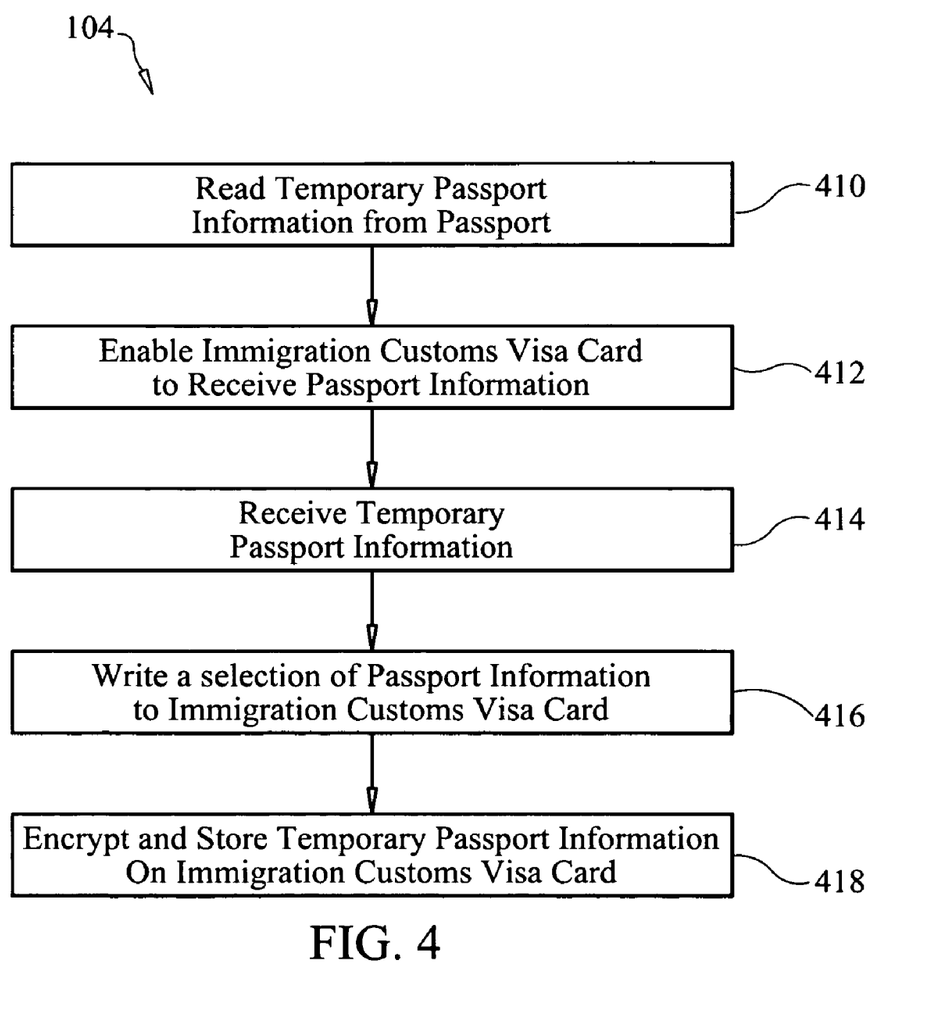
FIG. 4 is a flowchart of a method by which passport information is stored on the immigration customs visa card according to an embodiment of the invention.

FIG. 4 is a flowchart of a method 104 by which passport information 106 is stored on the immigration customs visa card 100 according to an embodiment of the invention. A foreigner entering the issuing country 112 of the immigration customs visa card 100 must first submit his or her passport 148 to customs 158 for inspection. The system 102 and method 104 of the invention reads the temporary passport information 106 from the foreigner's passport 148 (step 410) via a passport reader 154 connected to the computer 152 at the authorized institution 156. The system 102 and method 104 enables the immigration customs visa card 100 to receive the temporary passport information 106 from the passport 148 (step 412) via the passport reader 154 connected to the computer 152 for use by the passport card application program 150, executable on a computer 152, where the passport card application program 150 is configured for accessing the immigration customs visa card 100 in response to establishing connectivity between the immigration customs visa card 100 and the computer 152. As such, once connectivity is established, the passport card application program 150 can transfer the passport information 106 to the card.

The immigration customs visa card 100 receives the temporary passport information 106 from the passport card application program 150 or computer 152 (step 414). The computer 152 writes a selection of the temporary passport information 106 (step 416) to the immigration customs visa card 100 by detecting at least one data structure 220 field of the immigration customs visa card 100 adapted for receiving passport information 106 in response to the selection or as a default setting. The passport card application program 150 may be programmed to transfer a minimum selection, a plurality, or all of the passport information 106 from the passport 148 to the card. This might be accomplished via an affirmative selection or as a default setting such that the same passport information 106 can be readily and consistently transferred for each recipient of the card. The computer 152 encrypts and stores the temporary passport information (step 418) on the immigration customs visa card 100 in the data structure 220, or the computer 152, or a combination of the computer 152 and the immigration customs visa card 100. Thus, the passport information 106 stored on the card is stored in an encrypted format, yet remains accessible to merchants 242, 242' or other legal authorities 248, 248' using an authorized passport reader 154 which has the encryption key to unlock the passport information 106 stored thereon.

When the immigration customs visa card 100 is presented to these third-party merchants 192, 192' or other legal authorities 198, 198', the card is programmed to automatically provide at least one of the selection of passport information 106 stored thereon in response to a request for the same when read by an authorized passport reader 154.

In one embodiment, an apparatus for storing passport information 106 on an immigration customs visa card 100 as implemented by a computer 152 comprising: (a) means for enabling the immigration customs visa card 100 to receive temporary passport information 106 from a passport 148, i.e. via a passport reader 154 from an authorized institution 156 that is connected to the computer 152 for use by the passport card application program 150, executable on a computer 152, wherein the passport card application program 150 is configured for accessing the immigration customs visa card 100 in response to establishing connectivity between the immigration customs visa card 100 and the computer 152; (b) means for receiving the temporary passport information 106 from the passport card application program 150, or computer 152; (c) means for writing a selection of passport information 106 to the immigration customs visa card 100 by detecting at least one data structure 220 adapted for receiving passport information 100 in response to the selection or as a default setting; (d) means for encrypting and storing the temporary passport information 106 on the immigration customs visa card 100, or the computer 152, or a combination of the computer 152 and the immigration customs visa card 100; and (e) means for automatically providing at least one of the selection of the passport information 106 stored thereon in response to a request for the at least one of the selection of the passport information 106 when read by a passport reader 154.

In one embodiment, a system 102 for storing passport information 106 as implemented by a computer 152 comprising: a memory device 252, e.g. an electronic database 250; a computer 152 disposed in communication with the memory device 212, the computer 152 including instruction code 254, configured to: read temporary passport information 106 from a passport 148 via a passport reader 154 connected to the computer 152 at an authorized institution 156; enable the immigration customs visa card 100 to receive the temporary passport information 106 from the passport 148 via the passport reader 154 connected to the computer 152 for use by the passport card application program 150, executable on the computer 150, wherein the passport card application program 150 is configured for accessing the immigration customs visa card 100 in response to establishing connectivity between the immigration customs visa card 100 and the computer 152; receive the temporary passport information 106 from the passport card application program 150, or computer 152; write a selection of passport information 106 to the immigration customs visa card by detecting at least one data structure field adapted for receiving passport information 106 in response to the selection or as a default setting; encrypt and store the temporary passport information 106 on the immigration customs visa card 100, or the computer 152, or a combination of the computer 152 and the immigration customs visa card 100.

While the invention has been described in connection with specific embodiments and applications, the inventor does not intend to restrict the description to the examples shown. Persons skilled in the art will recognize that the above system 102 and methods 104, 104' may be modified or changed without departing from the general scope of the present description, the intention of the inventor being to include all such modifications and alterations in so far as they come within the scope of the appended claims or the equivalents thereof. It will be understood that each of the elements described above, or two or more together may also find a useful application in other types of methods 104, 104' differing from the type described above.

While certain novel features of this invention have been shown and described and are pointed out in the annexed claims, it is not intended to be limited to the details above, since it will be understood that various omissions, modifications, substitutions and changes in the forms, method 104, 104', steps and system 102 illustrated and in its operation can be made by those skilled in the art without departing in any way from the spirit of the present invention.

What is claimed is:

1. An apparatus comprising of:
   (a) a reusable immigration customs visa card, which includes an electronic data card configured for storing a passport holder's temporary passport information that may be erased for reissue of the immigration customs visa card to another passport holder and wherein said immigration customs visa card is configured for being accessed by a passport card application program executable on a computer;
   (b) said immigration customs visa card configured for receiving, through said passport card application program, a selection of said passport information from a passport reader or computer when issued by an authorized institution;
   (c) said immigration customs visa card configured for automatically providing at least one of said selection of said passport information stored thereon in response to a request for said at least one of said selection of said passport information when read by a passport reader; and
   (d) a microprocessor configured for automatically generating an electronic alarm signal that is transmitted remotely to an authorized institution when said immigration customs visa card is tampered with.

2. The apparatus of claim 1, wherein said immigration customs visa card is a functional component of a system, said system comprising of:
   (i) said computer;
   (ii) said passport card application program executable on said computer; and
   (iii) said passport reader connected to said computer and configured for reading passport information from a passport, and also configured for reading and writing said passport information to said immigration customs visa card, wherein said computer is configured with Internet connectivity for receiving reports on use activity of said immigration customs visa card from at least one third-party passport reader.

3. The apparatus of claim 1, wherein said immigration customs visa card is configured for being activated by an authorized institution of an issuing country to authorize use by recipient of immigration customs visa card as proof of identification or valid authorized entry within the issuing country's borders.

4. The apparatus of claim 1, wherein said immigration customs visa card is configured for displaying at least one passport information stored thereon in response to a request for said passport information from a third-party passport reader.

5. The apparatus of claim 1, wherein said passport information may comprise of any one or more of the following: photograph, issuing country, passport number, surname, given names, address, nationality, date of birth, place of birth, sex, race, height, color of eyes, date of issue, passport expiration date, occupation, place of issue, authority or endorsement.

6. The apparatus of claim 1, wherein said immigration customs visa card includes an identifier programmed to be stored in correlation to at least one passport holder's passport information.

7. The apparatus of claim 1, wherein said immigration customs visa card is selected from the group of electronic devices consisting essentially of smart cards, memory cards, and microprocessor cards.

8. The apparatus of claim 1, wherein said immigration customs visa card includes location determining means for determining the location of said immigration customs visa card with means for encoding said location into an electronic signal, which is transmitted to an authorized institution where said transmitted electronic signal is decoded and the location of said immigration customs visa card or use activity may be monitored in real-time.

9. The apparatus of claim 1, wherein the immigration customs visa card has external markings that may include but is not limited to any one or more of the following: issuing country's name, country's insignia, emblem, logo, drawings, characters, endorsement, card number, instructions.

10. The apparatus of claim 1, wherein the immigration customs visa card may include an embedded hologram.

11. The apparatus of claim 1, wherein said immigration customs visa card is configured for being remotely disabled by an electronic signal upon detection that said immigration customs visa card was tampered with.

12. The apparatus of claim 1, wherein said immigration customs visa card comprises of: mesh conductive wires interconnected with each other and an electronic circuit, where the electronic circuit includes a circuit board having a battery and a microprocessor positioned thereon and connected to communication means, wherein said microprocessor generates an electronic signal for an alarm providing the generated electronic alarm signal to said communication means for transmission of the electronic alarm signal to or from the authorized institution.

13. A system, comprising of:
   (a) a computer;
   (b) a passport card application program executable on said computer;
   (c) a passport reader connected to said computer and configured for reading passport information from a passport, and also configured for reading and writing said passport information to a reusable immigration customs visa card; and
   (d) said reusable immigration customs visa card, which includes an electronic data card configured for storing a passport holder's temporary passport information that may be erased for reissue of the immigration customs visa card to another passport holder and also configured for:
      (i) being accessed by a passport card application program executable on a computer;
      (ii) receiving, through said passport card application program, a selection of said passport information from the passport reader or computer when issued by an authorized institution;
      (iii) automatically providing at least one of said selection of said passport information stored thereon in response to a request for said at least one of said selection of said passport information when read by a passport reader; and
      (iv) automatically generating an electronic alarm signal that is transmitted remotely to an authorized institution when said reusable immigration customs visa card is tampered with.

14. The system of claim 13, wherein said computer is configured with Internet connectivity for receiving reports on use activity of said immigration customs visa card from at least one third-party passport reader.

15. The system of claim 13, wherein said immigration customs visa card is configured for being activated by an authorized institution of an issuing country to authorize use by recipient of immigration customs visa card as proof of identification or valid authorized entry within the issuing country's borders.

16. The system of claim 13, wherein said immigration customs visa card is configured for displaying at least one passport information stored thereon in response to a crequest for said passport information from a third-party passport reader.

17. The system of claim 13, wherein said passport information may comprise of any one or more of the following: photograph, issuing country, passport number, surname, given names, address, nationality, date of birth, place of birth, sex, race, height, olor of eyes, date of issue, passport expiration date, occupation, place of issue, authority or endorsement.

18. The system of claim 13, wherein said immigration customs visa card includes an identifier programmed to be stored in correlation to at least one passport holder's passport information.

19. The system of claim 13, wherein said immigration customs visa card is selected from the group of electronic devices consisting essentially of smart cards, memory cards, and microprocessor cards.

20. The system of claim 13, wherein said immigration customs visa card includes location determining means for determining the location of said immigration customs visa card with means for encoding said location into an electronic signal, which is transmitted to an authorized institution where said transmitted electronic signal is decoded and the location of said immigration customs visa card or use activity may be monitored in real-time.

21. The system of claim 13, wherein the immigration customs visa card has external markings that may include but is not limited to any one or more of the following: issuing country's name, country's insignia, emblem, logo, drawings, characters, endorsement, card number, instructions.

22. The system of claim 13, wherein the immigration customs visa card may include an embedded hologram.

23. The system of claim 13, wherein said immigration customs visa card is configured for generating an electronic signal for an alarm providing the generated electronic signal to communication means for transmission thereof to the authorized institution.

24. The system of claim 23, wherein said immigration customs visa card comprises mesh conductive wires interconnected with each other and an electronic circuit, where the electronic circuit includes a circuit board having a battery and a microprocessor positioned thereon and connected to communication means, wherein said microprocessor generates an electronic signal for an alarm providing the generated electronic alarm signal to said communication means for transmission of the electronic signal to or from the authorized institution.

25. A method, comprising of:
   (a) providing a reusable immigration customs visa card, which includes an electronic data card configured for storing a passport holder's temporary passport information that may be erased for reissue of the immigration customs visa card to another passport holder and wherein said immigration customs visa card is configured for being accessed by a passport card application program executable on a computer; said immigration customs visa card configured for receiving, through said passport card application program, a selection of said passport information from a passport reader or computer when issued by an authorized institution; and said immigration customs visa card configured for automatically providing at least one of said selection of said passport information stored thereon in response to a request for said at least one of said selection of said passport information when read by a passport reader; and
   (b) generating an electronic signal for an alarm providing the generated electronic signal to communication means for transmission thereof to an authorized institution when the immigration customs visa card is tampered with.

26. The method of claim 25, further comprising:
   (i) providing said computer;
   (ii) providing said passport card application program executable on said computer; and
   (iii) providing said passport reader connected to said computer and configured for reading passport information from a passport, and also configured for reading and writing said passport information to said immigration customs visa card.

27. The method of claim 25, wherein said computer is configured with Internet connectivity for receiving reports on use activity of said immigration customs visa card from at least one third-party passport reader.

28. The method of claim 27, wherein said immigration customs visa card is configured for being activated by an authorized institution of an issuing country to authorize use by recipient of immigration customs visa card as proof of identification or valid authorized entry within the issuing country's borders.

29. The method of claim 25, wherein said immigration customs visa card is configured for displaying at least one passport information stored thereon in response to a request for said passport information from a third-party passport reader.

30. The method of claim 25, wherein said passport information may comprise of any one or more of the following: photograph, issuing country, passport number, surname, given names, address, nationality, date of birth, place of birth, sex, race, height, color of eyes, date of issue, passport expiration date, occupation, place of issue, authority or endorsement.

31. The method of claim 25, wherein said immigration customs visa card includes an identifier programmed to be stored in correlation to at least one passport holder's passport information.

32. The method of claim 25, wherein said immigration customs visa card is selected from the group of electronic devices consisting essentially of smart cards, memory cards, and microprocessor cards.

33. The method of claim 25, wherein said immigration customs visa card includes location determining means for determining the location of said immigration customs visa card with means for encoding said location into an electronic signal, which is transmitted to an authorized institution where said transmitted electronic signal is decoded and the location of said immigration customs visa card or use activity may be monitored in real-time.

34. The method of claim 25, wherein the immigration customs visa card has external markings that may include but is not limited to any one or more of the following: issuing country's name, country's insignia, emblem, logo, drawings, characters, endorsement, card number, instructions.

35. The method of claim 25, wherein the immigration customs visa card may include an embedded hologram.

36. The method of claim 25, wherein said immigration customs visa card comprises mesh conductive wires interconnected with each other and an electronic circuit, where the electronic circuit includes a circuit board having a battery and a microprocessor positioned thereon and connected to communication means, wherein said microprocessor generates an electronic signal for an alarm providing the generated electronic alarm signal to said communication means for transmission of the electronic signal to or from the authorized institution.

37. An apparatus for storing passport information on an immigration customs visa card as implemented by a computer comprising:
(a) means for enabling the immigration customs visa card to receive a passport holder's temporary passport information from a passport via a passport reader from an authorized institution that is connected to said computer for use by said passport card application program, executable on a computer, wherein said passport card application program is configured for accessing said immigration customs visa card in response to establishing connectivity between said immigration customs visa card and said computer;
(b) means for receiving said passport holder's temporary passport information from said passport card application program, or computer;
(c) means for writing a selection of passport information to said immigration customs visa card by detecting at least one data structure field adapted for receiving passport information in response to said selection or as a default setting;
(d) means for encrypting and storing said temporary passport information on said immigration customs visa card, or said computer, or a combination of said computer and said immigration customs visa card, wherein said passport holder's temporary passport information may be erased for reissue of the immigration customs visa card to another passport holder;
(e) means for automatically providing at least one of said selection of said passport information stored thereon in response to a request for said at least one of said selection of said passport information when read by a passport reader; and
(f) means for automatically generating an electronic alarm signal that is transmitted remotely to an authorized institution when said immigration customs visa card is tampered with.

38. A method of storing passport information on an immigration customs visa card as implemented by a computer comprising:
(a) reading a passport holder's temporary passport information from a passport via a passport reader connected to said computer at an authorized institution;
(b) enabling the immigration customs visa card to receive said passport holder's temporary passport information from a passport via a passport reader connected to said computer for use by said passport card application program, executable on a computer, wherein said passport card application program is configured for accessing said immigration customs visa card in response to establishing connectivity between said immigration customs visa card and said computer;
(c) receiving said temporary passport information from said passport card application program, or computer;
(d) writing a selection of passport information to said immigration customs visa card by detecting at least one data structure field adapted for receiving passport information in response to said selection or as a default setting; and
(e) encrypting and storing said temporary passport information on said immigration customs visa card in said data structure field, or said computer, or a combination of said computer and said immigration customs visa card wherein said passport holder's temporary passport information may be erased for reissue to another passport holder;
(f) generating an electronic alarm signal that is transmitted remotely to an authorized institution when said immigration customs visa card is tampered with.

39. A system for storing passport information as implemented by a computer comprising:
(a) a memory device; and
(b) a computer disposed in communication with said memory device, the computer including instruction code, configured to:

(i) read temporary passport information from a passport via a passport reader connected to said computer at an authorized institution;

(ii) enable the immigration customs visa card to receive said temporary passport information from said passport via said passport reader connected to said computer for use by said passport card application program, executable on said computer, wherein said passport card application program is configured for accessing said immigration customs visa card in response to establishing connectivity between said immigration customs visa card and said computer;

(iii) receive said temporary passport information from said passport card application program, or computer;

(iv) write a selection of said passport holder's temporary passport information to said immigration customs visa card by detecting at least one data structure field adapted for receiving passport information in response to said selection or as a default setting;

(v) encrypt and store said temporary passport information on said immigration customs visa card, or said computer, or a combination of said computer and said immigration customs visa card wherein said passport holder's temporary passport information may be erased for reissue to another passport holder;

(vi) generate an electronic signal for remotely disabling said immigration customs visa card upon receiving an electronic signal that said immigration customs visa card was tampered with.

\* \* \* \* \*